Patented July 16, 1946

2,404,267

UNITED STATES PATENT OFFICE 2,404,267

METHACRYLIC ESTERS AND COPOLYMERS THEREOF

Carl E. Barnes, Acton, Mass., assignor to Polaroid Corporation, Dover, Del., a corporation of Delaware No Drawing. Application February 20, 1942, Serial No. 431,732

1 Claim. (Cl. 260—486)

This invention relates to a new and improved synthetic resin and more particularly to alpha (o-chlorophenyl) ethyl methacrylate.

An object of the invention is to provide such a resin which is useful in the formation of hard, transparent, optical elements possessing relatively high indices of refraction.

Further objects of the invention are to provide a polymerized resin of the character described and to provide a copolymer of a resin of the character described with a resin from the class consisting of the unsaturated methylene compounds, and more specifically to provide a copolymer of a resin of the character described with a methacrylate resin.

Other objects of the invention will in part be obvious and will in part appear hereinafter.

There is a pressing demand for a synthetic resin composition which may be used in the formation of optical elements such for example as lenses, prisms, and the like and which may preferably be cast or molded to the desired form. A preferred resin is one which may be cast into the desired form by, for example, polymerizing the monomer in a suitable mold or by advancing the polymerization of the partially polymerized material in a suitable mold. This invention contemplates the provision of new synthetic resins or plastics which are particularly useful in the production of products of the character described. More specifically, this invention contemplates the provision of synthetic resins which, when polymerized, give a transparent, hard, substantially colorless product having a relatively high index of refraction and which is suitable for use in the production of optical elements of the character described.

The compositions of the present invention comprise resins from the class consisting of alpha (o-chlorophenyl) ethyl methacrylate and copolymers thereof with other resins from the class consisting of the unsaturated methylene compounds.

Alpha (o-chlorophenyl) ethyl methacrylate may be prepared in the following manner, which is given as illustrative of one method of preparing the material. A suitable quantity of o-chlorophenyl methyl carbinol having a boiling point of 123 degrees C. at 18 mm. pressure was prepared from o-chlorobenzaldehyde and methyl magnesium bromide in ways known to the art. 156.5 grams (1 mol) of o-chlorophenyl methyl carbinol was mixed in a suitable flask with 154 grams (1 mol) of methacrylic anhydride and 79 grams (1 mol) of pyridine. A small amount of copper cloth was added to the mixture as an inhibitor of polymerization. The mixture was then permitted to stand at a temperature of from 50 to 60 degrees C. for several hours and was diluted with ether and extracted several times with dilute sulphuric acid. It was then washed several times with dilute sodium hydroxide and finally with water. The ether layer was then concentrated and distilled under reduced pressure, alpha (o-chlorophenyl) ethyl methacrylate being distilled off.

Monomeric alpha (o-chlorophenyl) ethyl methacrylate is a liquid with a boiling point of approximately 146 degrees C. at 11 mm. pressure. In polymerizing the monomer, either alone or conjointly with a resin from the class consisting of the unsaturated methylene compounds, polymerization is preferably commenced at a temperature of from about 60 to 65 degrees C., and the temperature is preferably raised before polymerization is completed to approximately 130 degrees C.

The polymeric alpha (o-chlorophenyl) ethyl methacrylate has a density at 20 degrees C. of 1.269. It has an index of refraction ($n_D^{20}$) of 1.562 and a reciprocal dispersion of 37.5. It is substantially colorless, hard, brittle and transparent.

It will be noted that the refractive index of the polymer of alpha (o-chlorophenyl) ethyl methacrylate is above 1.55, which is a preferred condition. The polymer is, however, somewhat brittle, and where it is to be employed under conditions such that it may be subjected to shock, it may be desirable to combine it with plastics whose polymers are somewhat tougher. This is especially true where the high refractive index is not required. In this connection it should be noted that alpha (o-chlorophenyl) ethyl methacrylate may satisfactorily be copolymerized with virtually all the polymerizable unsaturated methylene compounds to produce products having diverse and varied physical and optical properties. Suitable compounds for use in forming copolymers of the type described with alpha (o-chlorophenyl) ethyl methacrylate are methyl methacrylate, ethyl methacrylate, isopropyl methacrylate, ter-butyl methacrylate, cyclohexyl methacrylate and other esters of alpha-methacrylic acid; the vinyl esters such as vinyl formate, vinyl acetate, vinyl propionate and the vinyl ester of chloracetic acid, etc.; the vinyl ketones such as methyl vinyl ketone; styrene; furylethylene (vinyl furane). Other suitable materials for use in the formation of copolymers falling within the scope of this invention are the esters of itaconic acid, the esters of acrylic acid, and the esters of methylene malonic acid.

It is to be understood that the list of substances given is not all-inclusive although it is believed that the materials mentioned constitute the preferred substances for use in the present invention.

It is also to be understood that, if desired, hardening agents may be employed in small or substantial percentages. Any of a vast number of suitable hardening agents may be used. A preferred hardening agent for use with copolymers comprising methyl methacrylate is either methacrylic acid or acrylic acid, although other known hardening agents such as methacrylic anhydride or allyl methacrylate may be used successfully.

While a preferred product is one which is transparent and which may be molded during polymerization into a suitable optical element, it is to be understood that products which are translucent or even opaque and hence useless in the formation of optical elements may be satisfactorily employed for other purposes where particularly hard, readily molded, polymerized plastics are desirable, and such products comprising alpha (o-chlorophenyl) ethyl methacrylate or a copolymer thereof with an unsaturated methylene compound are to be deemed to fall within the scope of this invention.

Polymerization of the products of this invention may be accomplished preferably by heating mixtures of monomers or the slightly polymerized materials at relatively low temperatures, or just above the melting point of the monomer, until a hard product is obtained, when polymerization may be carried forward to a desired point at substantially increased temperatures. Higher temperatures of polymerization generally increase the brittleness of the product. It is, of course, to be understood that where molded optical elements are to be produced, the surfaces of the mold should be optically smooth as the molded product will have substantially the surface properties of the mold.

Since certain changes may be made in the above article and different embodiments of the invention could be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

Alpha (o-chlorophenyl) ethyl methacrylate.

CARL E. BARNES.